(12) United States Patent
Barzelay et al.

(10) Patent No.: US 11,176,191 B2
(45) Date of Patent: Nov. 16, 2021

(54) SEARCH RESULT IMAGE SELECTION TECHNIQUES

(71) Applicant: Amazon Technologies, Inc., Seattle, WA (US)

(72) Inventors: Zohar Barzelay, Potsdam (DE); Brad Bowman, Berlin (DE); Michael Donoser, Berlin (DE); Nikhil Garg, Berlin (DE); Matthieu Guillaumin, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 16/254,032

(22) Filed: Jan. 22, 2019

(65) Prior Publication Data
US 2020/0233898 A1    Jul. 23, 2020

(51) Int. Cl.
| | |
|---|---|
| *G06F 16/53* | (2019.01) |
| *G06F 16/538* | (2019.01) |
| *G06F 16/54* | (2019.01) |
| *G06F 16/9535* | (2019.01) |
| *G06F 16/2457* | (2019.01) |
| *G06N 3/08* | (2006.01) |
| *G06Q 30/06* | (2012.01) |
| *G06F 3/0485* | (2013.01) |

(52) U.S. Cl.
CPC ...... *G06F 16/538* (2019.01); *G06F 16/24578* (2019.01); *G06F 16/54* (2019.01); *G06F 16/9535* (2019.01); *G06N 3/08* (2013.01); *G06Q 30/0643* (2013.01); *G06F 3/0485* (2013.01)

(58) Field of Classification Search
CPC ..... G06F 16/538; G06F 16/54; G06F 16/9535
See application file for complete search history.

(56) References Cited

U.S. PATENT DOCUMENTS

| | | | |
|---|---|---|---|
| 10,515,125 B1 * | 12/2019 | Lavergne | .............. G06F 16/316 |
| 2016/0217157 A1 * | 7/2016 | Shih | .................... G06F 16/5854 |
| 2017/0243275 A1 * | 8/2017 | Goens | ................ G06Q 30/0625 |
| 2020/0004918 A1 * | 1/2020 | Sha | ..................... G03F 7/70433 |

FOREIGN PATENT DOCUMENTS

WO     2019011936     1/2019

OTHER PUBLICATIONS

PCT/US2020/014085, "International Search Report and Written Opinion", dated Apr. 7, 2020, 12 pages.

* cited by examiner

*Primary Examiner* — Loc Tran
(74) *Attorney, Agent, or Firm* — Kilpatrick Townsend & Stockton LLP

(57) ABSTRACT

Techniques for prioritizing images associated with an item to display an appropriate image based on a query are described herein. For example, an attention score for an item attribute in an image of an item may be generated based at least in part on a model that uses one or more images of the item. The item attribute for the item associated with a query may be obtained. A plurality of items may be determined based at least in part on the item attribute being associated with the plurality of items where an individual item of the plurality of items includes a plurality of images of the item. The plurality of images of the individual item may be ranked based at least in part on corresponding attention scores associated with each image of the plurality of images.

15 Claims, 14 Drawing Sheets

SEARCH RESULT IMAGE SELECTION TECHNIQUES

BACKGROUND

Users can browse and order a plethora of items offered by online retailers through the use of computer devices and networks. Users can search for specific items or browse through categories of items offered by retailers that in turn provide information about the offered items such as prices and shipping availability. Some retailers include one or more images of an offered item to aid the user in visualizing the item or certain aspects of the item. In some instances, each item may have any associated images. Thus, there are technical challenges in determining which image to present in response to an item search.

BRIEF DESCRIPTION OF THE DRAWINGS

Various embodiments in accordance with the present disclosure will be described with reference to the drawings, in which.

DETAILED DESCRIPTION

Figure 1:
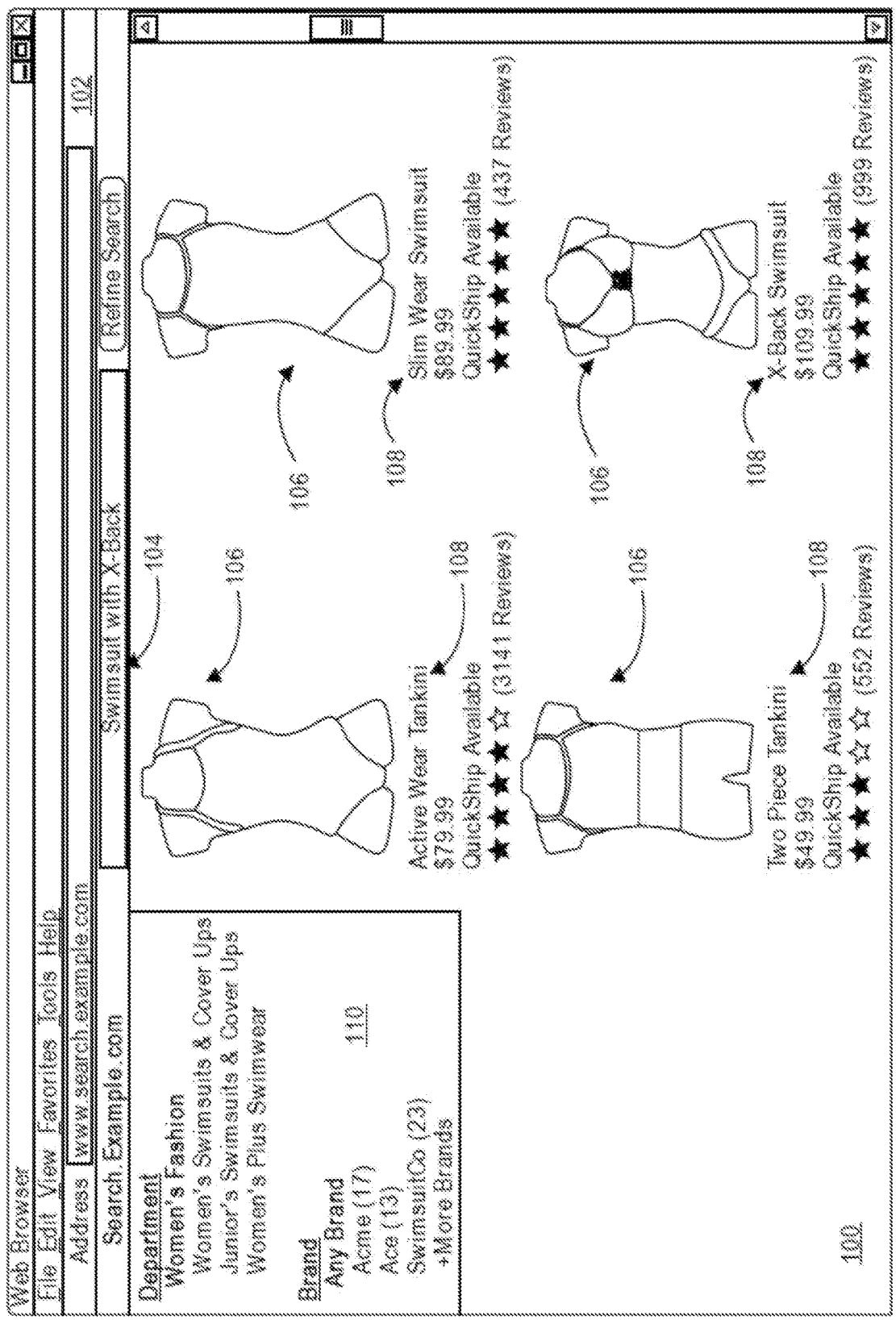
FIG. 1 illustrates a user interface displaying an item result set in response to a query.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for prioritizing images associated with an item based at least in part on a search context for the item as derived from text associated with a query for the item. In embodiments, online merchants may provide or offer items and include information about the offered items such as order details, item details, and one or more images of the item. Each image of the item may present a different perspective of the item or focus on a particular item attribute of the item. In accordance with at least one embodiment, the online merchant may designate an image associated with the item as a representative image. A representative image may, for example, be the image that is presented via a user interface in response to a user searching for or otherwise interacting with the item offered by the online store. For example, in response to a user searching for a tennis shoe a particular merchant may designate an image with a top down perspective of the tennis shoe as the representative image. However, if the user is searching for shoes with a strong sole the user would be interested in being presented with images of the soles of shoes. A user may not know or otherwise interact with a given item in the user interface of an online store to find the image that provides the perspective of item attribute of interest and instead abandon their shopping mission or move on to another store. The image selection feature described herein and implemented by the service provider computers may improve over conventional image selection processes by taking into account the search context or item attribute that a user is interested in and prioritizing the images associated with each item in an item result set. Computer resources can also be saved as images for certain items do not need to be fully rendered or provided as the system utilizes the ranking of the images according to their associated attention scores to present images which are relevant to the search context. Although several examples described herein refer to images associated with items offered by online stores, embodiments of the present disclosure are applicable for use in other environments where images with certain features or attributes are identified and ranked according to generated attention scores. The images for an item in the item result set can be ranked such that the image presented to the user in the item result set for each item includes the perspective that gives them the best view or information regarding the item attribute.

In a non-limiting example, a user may search for or enter a query for a "swimsuit with X-back" in a user interface associated with a catalog of items. The service provider computers implementing the user interface may extract or otherwise identify an item attribute associated with the item for which the user is searching (e.g., "X-back" for a swimsuit). The user interface may be updated with an item result set that includes information about a plurality of swimsuits with "X-back(s)" including prices, shipping options, and a prioritized image of each item listing that includes the item attribute. Unlike conventional item listing or result set services provided by online retailers, the item result set presented to a user via the user interface presents an associated image of each item that contains or otherwise includes the "X-back" perspective of the swimsuit instead of a representative image of the swimsuits which may not include a perspective or focus on the "X-back" nature of the swimsuit. In this way a user is able to efficiently browse through a number of items for the particular feature or item attribute they are interested in without having to navigate within each item separately and find the image that shows the perspective of interest for the given item.

In accordance with at least one embodiment, the service provider computers may rank/prioritize each image of a set of images that are associated with each item based on an item attribute associated with that item. For example, user's may wish to see a certain item attribute associated with a shoe closure type (e.g., laces). The image selection feature may be configured to rank or prioritize the images associated with shoes that otherwise fit the user's search criteria such that the image presented via the user interface includes the best perspective of the laces for each shoe. In embodiments, an item attribute may include a physical characteristic of an item. Examples of an item attribute may be a certain feature such as shoe closure types (e.g., laces, Velcro, buckle, zipper, slip-on, etc.) or clothing types (e.g., tank tops, X-back, midriff, etc.). Item attributes may include perspectives of an item such as a top down view, a bottom view, a side view, etc. In accordance with at least one embodiment, an attribute may include features associated with an item that are not physical characteristics. For example, an outdoor item may include an image of the item in an outdoor setting such that an attribute of the image may include an outdoor attribute. As another example, a camera that is meant to work underwater may be associated with an image that shows the camera operating underwater. This particular image may include an underwater item attribute that is not associated with a physical characteristic of the item itself but instead a global item attribute or image attribute of the item. In embodiments, the image selection feature includes using a neural network image processing algorithm to generate an attention score for a given item attribute for an item. The neural network image processing algorithm may use the images associated with each item to identify an item attribute or item attributes associated with each item and generate an attention score for a given item attribute. An example neural network image processing algorithm may include a convolutional neural network. In accordance with at least one embodiment, an attention score may represent a likelihood that an item attribute is present or included in a given image of an item with a higher attention score representing a greater likelihood that the item attribute is present or included. In embodiments, a model or algorithm may be configured to use text or other information, such as annotations, associated with an image to generate attention scores for item attributes that do not include physical characteristics of the item such as in the examples explained above regarding an underwater camera image.

In embodiments, the service provider computer may be configured to rank or prioritize the images based at least in part on their respective attention scores such that the user interface that presents information about the items in response to the query for an item and item attribute will present the highest ranked image (e.g., the image with the highest attention score for the item attribute) instead of a representative image for the item. In embodiments, the attention scores for the item attributes may be generated offline or prior to a query such that at run-time or upon receiving a query, the service provider computers implementing the image selection feature may rank or otherwise weigh the images associated with an item based on the generated attention scores for an item attribute of an item that corresponds to the query. In accordance with at least one embodiment, the image selection feature may also utilize a class activation image processing algorithm to generate a two dimensional (2-D) map of an image for an item and pixel ranges for each 2-D map or image that represent areas of the item where the item attribute is present or included. In embodiments, the service provider computers may provide a zoomed in or closer focus of an image that includes an item attribute of interest using the 2-D map of the item and/or the pixel ranges identified by the class activation image processing algorithm. The zoomed in or focused image of an item attribute in an image may be selected according to the associated attention score for the image to present to the user instead of the representative image as described herein.

In accordance with at least one embodiment, a user may interact with a user interface provided by the service provider computer to select an item attribute from a list of item attributes generated by the service provider computers for a set of items. For example, a user may search for tennis shoes and be presented with an item result set that includes representative images of each shoe that matches the criteria of tennis shoe. The service provider computers may utilize the neural network algorithm or model to identify the item attributes associated with each item in the item result set and present the item attributes as user interface (UI) objects that the user can interact with to update the UI of the item result set. For example, the user may select slip-on as the item attribute of interest which will cause the UI to update the images presented for each item from the representative image to an image that includes a view of the item attribute for slip-on shoes. The update to the UI for changing the image presented via the UI may not change the contents of the item result set but instead may prioritize or rank the images for each item in the item result set such that the image presented is the one with the item attribute of interest (slip-on) according to the associated attention score for the image. In accordance with at least one embodiment, the image selection feature may also utilize and process user provided images in user reviews for an item. For example, attention scores may be generated for item attributes identified in user provided images for an item and may replace a merchant provided image for an item based on the item attribute that a user has indicated they are interested in for the item. In embodiments, the identified item attributes and attention score pairs as well as the 2-D map and pixel ranges may be associated with each item and maintained by the service provider computers for subsequent use. The identification of the item attributes and generation of the attention scores for the item attributes and 2-D map and pixel ranges may be performed dynamically upon receiving a request for an item or periodically.

FIG. 1 illustrates a user interface displaying an item result set in response to a query. FIG. 1 illustrates a user interface 100 presented by a web browser 102. In the user interface 100 a user may provide a search text string for an item or query 104 such as "Swimsuit with X-Back." Conventional user interfaces such as user interface 100 may present an item result set that includes images 106 and item details 108 associated with the images 106. The user interface 100 may include filters or other UI objects 110 that a user can use to navigate to different sets of items associated with the query 104. As illustrated in FIG. 1, the user has entered a search term for swimsuits with an "X-back" 104. However, the item result set, which includes images 106 and item details 108, depict front facing images for each swim suit result. Each item may have an image which depicts the particular swimsuit having an "X-back" but the user may have to interact with or otherwise browse through all the associated images of an item to view such a perspective of the item. Users may become frustrated as they are required to interact with each item in the item result set to view a perspective of the item that includes the interested item attribute ("X-back") resulting in an inefficient browsing or shopping session that includes interacting with several UI objects or transitioning between several web pages to identify the appropriate image for a given item. Conventional user interfaces such as user interface 100 may not present an appropriate image or perspective of a given item that emphasizes or focuses on an item attribute that a user is interested in which may lead to the user abandoning their shopping or browsing mission.

Figure 2:
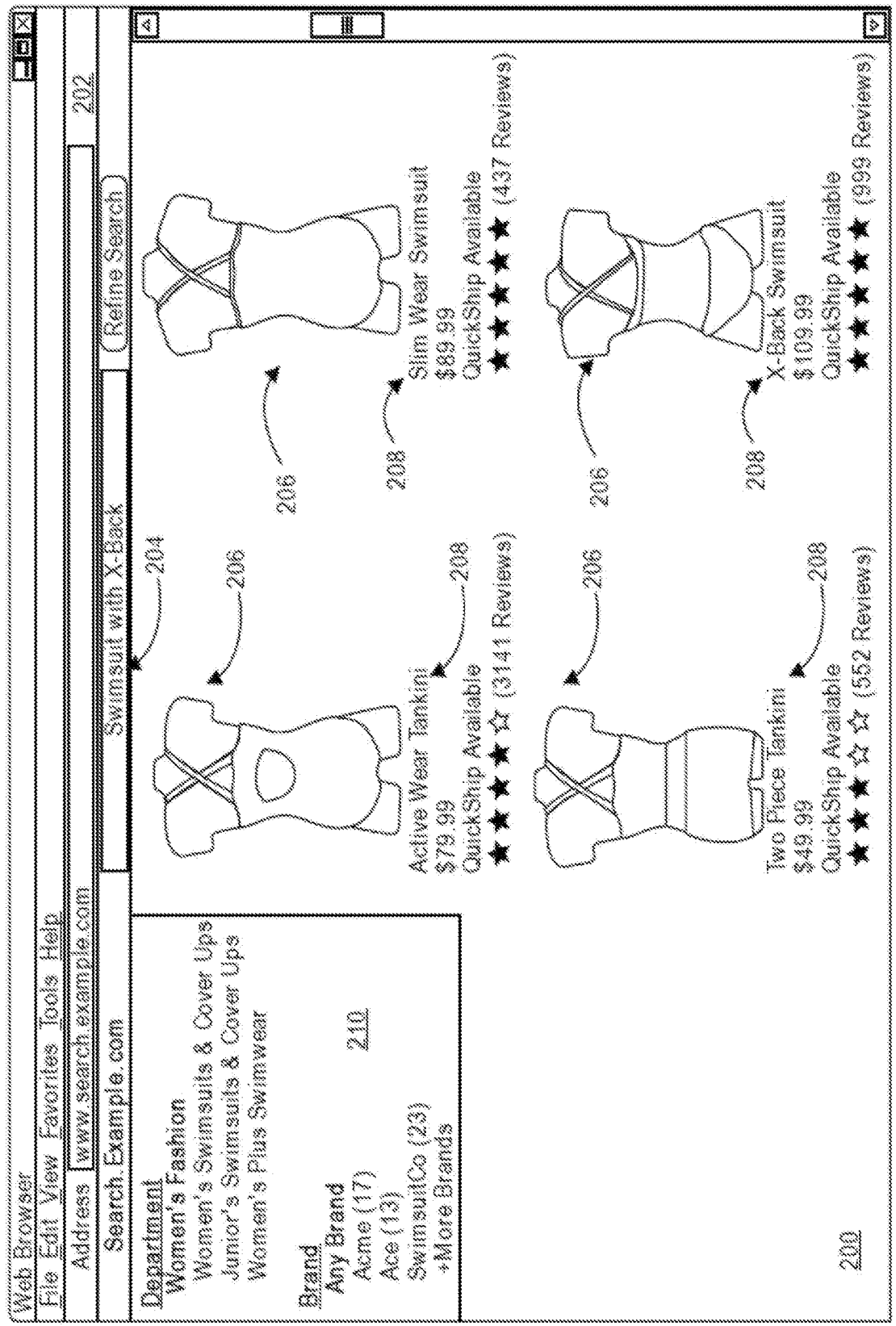
FIG. 2 illustrates an example user interface displaying item result images according to an implementation of an image selection feature, in accordance with at least one embodiment.

FIG. 2 illustrates an example user interface displaying item result images according to an implementation of an image selection feature, in accordance with at least one embodiment. FIG. 2 depicts user interface (UI) 200 presented via web browser 202 that implements the image selection feature described herein. In accordance with at least one embodiment, a user may provide a search text string or query 204 ("Swimsuit with X-back") similar to the query 104 of FIG. 1. In embodiments, the service provider computers implementing the image selection feature and the user interface 200 may be configured to rank the images associated with each item in an item result set that is presented to the user in response to the query 204 where the highest ranked image is presented via the user interface 200 and includes the item attribute ("X-back") that the user provided via the query 204. In accordance with at least one embodiment, the service provider computers may be configured to extract or otherwise translate the text of query 204 into one or more item attributes for items offered by an online store. The service provider computers may then generate an item result set for one or more items that include the item attribute. For example, the service provider computer may utilize text, metadata, or annotations associated with each item offered by the online store to identify candidates for inclusion in an item result set that is presented to the user via UI 200.

In embodiments, the service provider computer may be configured to obtain and process text, metadata, annotations, or other information associated with each item such as user reviews to determine that the item is associated with an item attribute that matches the item attribute of query 204 ("X-back"). The items that include or match the item attribute of query 204 ("X-back") may be referred to as the item result set as they include the items that most appropriately correspond to the search term, text, or query 204. In accordance with at least one embodiment, the service provider computers may be configured to use a neural network image processing algorithm or model to generate an attentions core for each image of the images associated with each item in the item result set. As described herein, an attention score may represent the likelihood that a given image in a set of images includes, depicts, or is detected as having the item attribute in question ("X-back"). In accordance with at least one embodiment, the neural network image processing algorithm or model may be trained to predict an item attribute present in an image by using various information sources of images. For example, the neural network image processing algorithm may be trained using data from an image processing service or large image data repository. The neural network image processing algorithm may be further trained or updated using images from the catalog of items offered by an online merchant as well as annotations provided by users or administrators associated with the service provider computers. It should be noted that although the neural network image processing algorithm may be trained using the above described information sources of images the current disclosure also includes using other information sources such as user provided images or other suitable annotated or non-annotated images that aid the algorithm in predicting the presence of an item attribute in a given image.

In embodiments, the neural network image processing algorithm of the service provider computers may rank the images associated with each item based on the attentions core for the item attribute in question ("X-back") where the highest ranked image is associated with the highest or greatest attention score. The images associated with each item may be ranked or prioritized according to their respective attention score such that a user who browsed through the images would begin with the image that has the most likelihood of including the item attribute they are interested in and continue to decline in likelihood of inclusion of the item attribute based on the associated attention scores. In accordance with at least one embodiment, the service provider computers may update the user interface 200 to present an image 206-212 for each item that is ranked the highest according to their respective attention scores for including the item attribute "X-back" of query 204. Similar to the user interface 100 of FIG. 1, each image 206-212 of user interface 200 may also be accompanied by item details 214-220, respectively.

The user interface 200 may also include UI objects 222 for browsing to or navigating to associated item sets. However, as illustrated in FIG. 2, a user is presented with an image for each item listing in the item result set that includes the item attribute in question, the "X-back" of a swimsuit. By generating attention scores for each image in the set of images associated with each item and ranking the images such that the highest ranked image is presented via the user interface 200, a user is able to efficiently and without frustration browse through or shop for an item with a particular item attribute. In embodiments, the user interface 200 may be configured to present the representative image for each item and update or scroll to the highest ranked image for each item and item attribute ("X-back") based on input that indicates a user is hovering over or otherwise interacting with a particular item in the UI 200 such as with a mouse of a user device or other suitable input/output device (e.g., touch screen input). For example, each item may be configured to present one image at a time via an image carousel and upon receiving input that indicates that a user is interacting with a given item in the UI 200, the UI 200 may be configured to scroll through the image carousel to a particular image that includes the highest attention score for the item attribute in question or associated with query 204. In some embodiments, the UI 200 may be configured to present the highest ranked image as a picture-in-picture in a portion of the representative image such that a user is able to view multiple perspectives of the item including a perspective that includes the item attribute in question.

Figure 3:
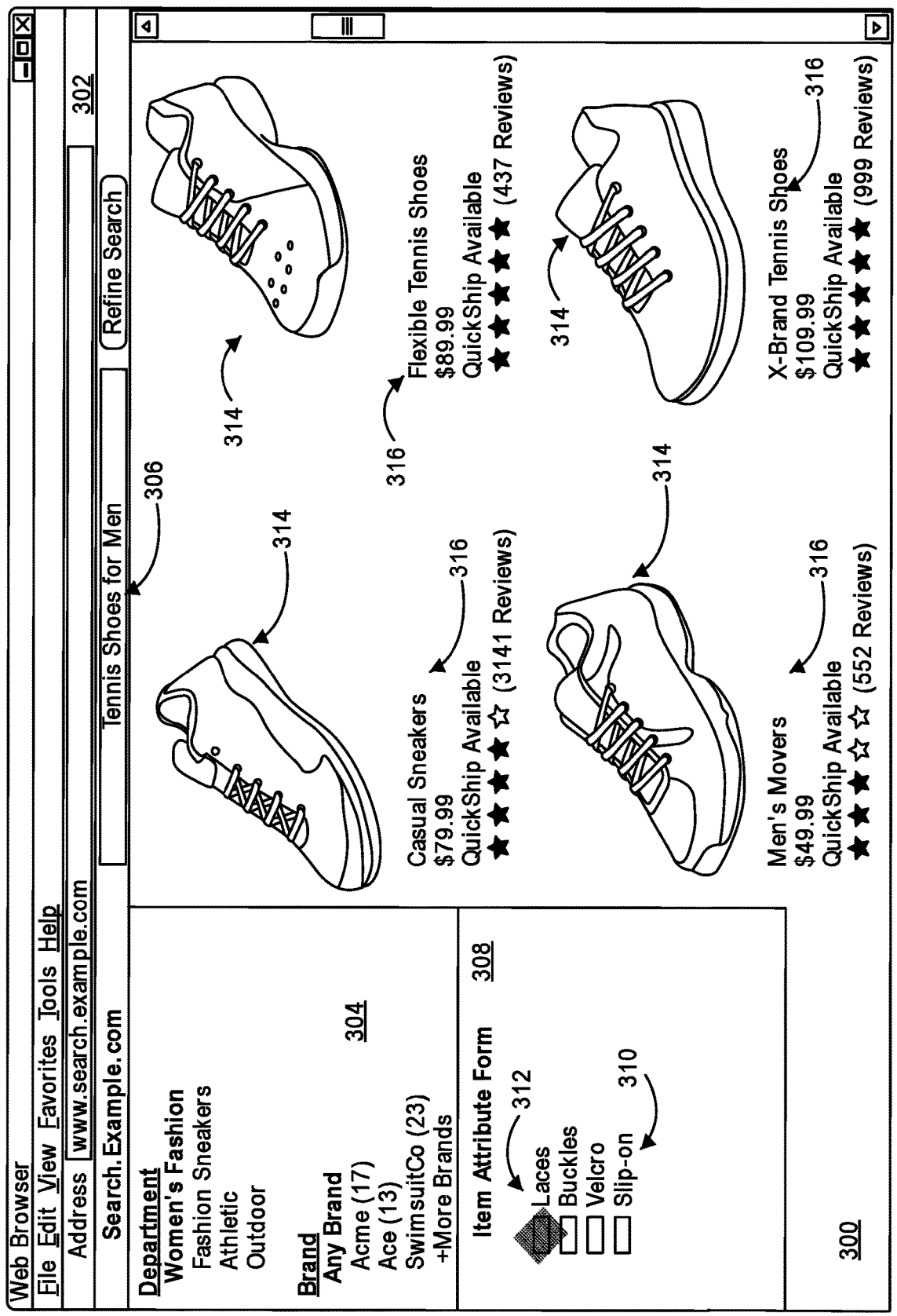
FIG. 3 illustrates an example user interface displaying item result images according to an implementation of an image selection feature, in accordance with at least one embodiment.

FIG. 3 illustrates an example user interface displaying item result images according to an implementation of an image selection feature, in accordance with at least one embodiment. FIG. 3 depicts user interface (UI) 300 presented via web browser 302. The (UI) 300 may include UI objects 304 for browsing to or navigating to other sections of items or associated items. In FIG. 3, a user may have provided a text string or query 306 for "Tennis shoes for men." In embodiments, the image selection feature implemented by the service provider computers may present the item result set for the query 306 including information about the items as well as a representative image of the item similar to the UI 100 of FIG. 1. However, the UI 300 of FIG. 3 also includes item attribute form 308 that includes one or more item attributes 310 associated with the item result set for query 306. In accordance with at least one embodiment, the service provider computers may be configured to identify or determine the item attributes for the items included in the item result set and present the item attributes for selection in the item attribute form 308. For example, in FIG. 3, as the query 306 is for "Tennis shoes for men" the one or more item attributes 310 may include different closure types such as laces, buckles, Velcro, or slip-ons.

In embodiments, a user may utilize user interface 300 and item attribute form 308 to select a particular item attribute, such as laces 312, which causes the user interface 300 to update from the representative image of each item (not shown) to the highest ranked image for each item in the item result set that includes the selected item attribute (laces 312) as depicted in images 314 for each item. As depicted in FIG. 3, the UI 300 presents the highest ranked image for each item (314) that might include a slightly different perspective of each item (shoe) but that includes the item attribute in question (laces 312). The UI 300 of FIG. 3 updates the image for each item to the image that includes the highest attention score for the item attribute selected by the user (laces 312) without changing the contents of the item result set. As described herein, the image selection feature implemented by the service provider computers may generate an attention score for each item attribute and image associated with each item using one or more neural network image processing algorithms or models.

Upon receiving the input from the user via the UI 300 and item attribute form 308 that indicates the particular item attribute or item attributes, the service provider computer can rank the images for each item according to the attention score for the given item attribute or item attributes. The ranked images can be used to update the UI 300 and present the highest ranked image for each item in the item result set associated with the item attribute in question (laces 312). The UI 300 may also include item details for each item 316 associated with the item images 314 in the item result set. Users may select a different item attribute 310 or multiple item attributes 310 for the item result set presented via UI 300 which would cause the images for each item to update according to the corresponding attention scores of each item image for the newly selected item attributes. In accordance with at least one embodiment, the service provider computers may maintain and associate the item attribute detected in each image, the corresponding attention score for the item attribute, and a 2-D map and associated pixel ranges as determined by a class activation image processing algorithm which identifies the portions of the image in which the algorithm identified the item attribute or feature, laces in tennis shoes for example as described in more detail with reference to FIG. 5. The service provider computers may recalculate the attention scores for images of items periodically or upon receiving new input such as images provided by users in reviews for an item or in response to receiving new images from merchants or other third parties associated with an item. In accordance with at least one embodiment, the service provider computers may generate the attention scores for the item attribute(s) present in images for an item offline or dynamically upon receiving a query 306.

Figure 4:
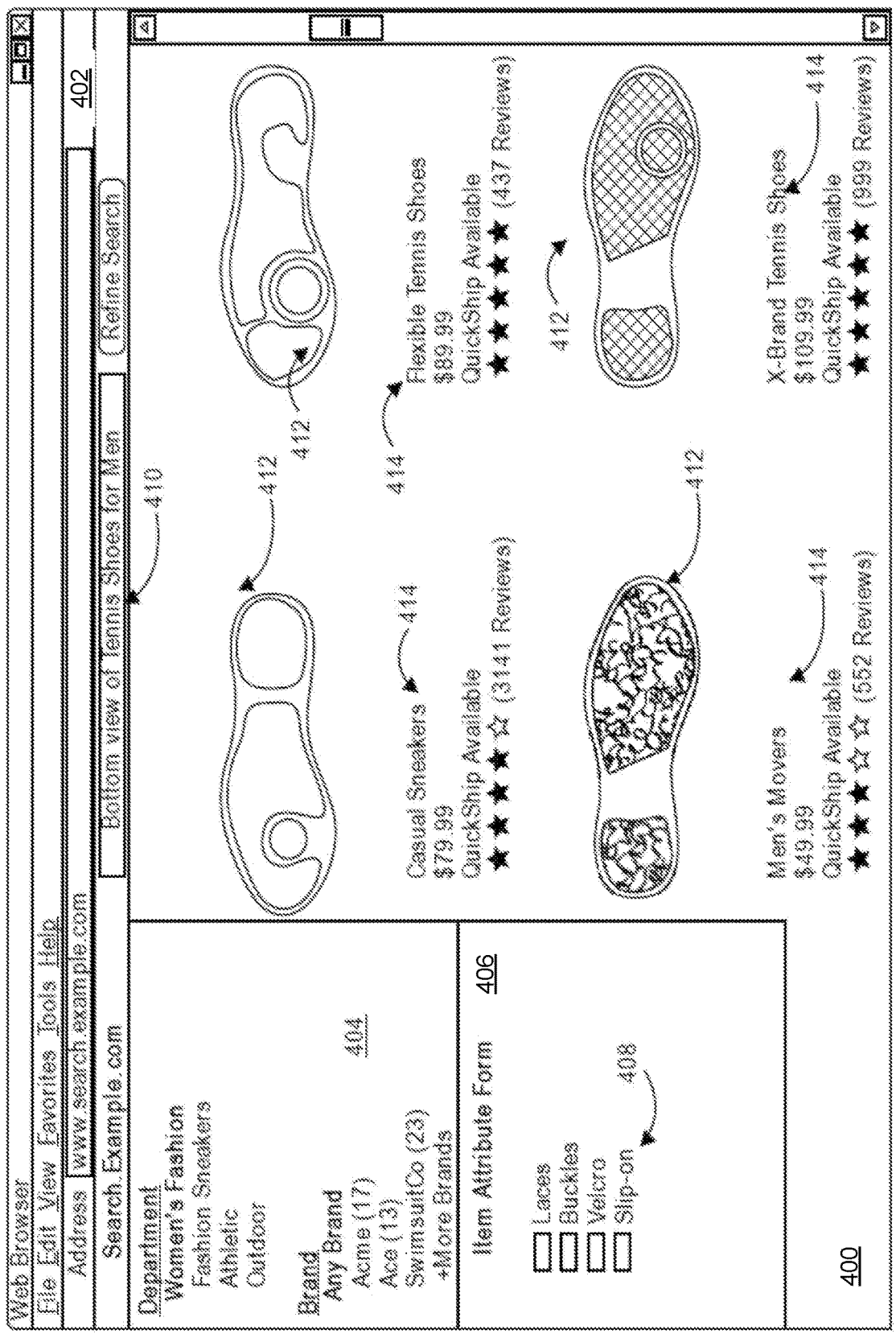
FIG. 4 illustrates an example user interface displaying item result images according to an implementation of an image selection feature, in accordance with at least one embodiment.

FIG. 4 illustrates an example user interface displaying item result images according to an implementation of an image selection feature, in accordance with at least one embodiment. FIG. 4 depicts a user interface 400 being presented by web browser 402. Although FIGS. 1-4 and other FIGS. in the disclosure describe user interfaces being presented or implemented by a web browser such as web browser 402, embodiments described herein may be implemented by other suitable applications configured to present a user interface. The user interface 400 includes UI objects 404 for browsing to or navigating to other sections of items or associated items as well as an item attribute form 406 for selecting a particular item attribute(s) 408 as described with reference to FIG. 3. In accordance with at least one embodiment, the image selection feature implemented by the service provider computers may be configured to identify a particular view of perspective of an item as an item attribute from a query 410 provided by a user.

In embodiments, the neural network image processing algorithm or model of the image selection feature may be configured to identify an item attribute for an image of an item that is associated with a particular perspective or view of the item. The neural network image processing algorithm may generate an attention score associated with each perspective or view of an image for an item that represents the likelihood that the image of the item depicts a certain perspective or view such as top down view, bottom view, side view, etc. The service provider computers may rank the images associated with each item according to the generated attention scores for use in presenting a certain perspective or view of an item similar to the item images presented in user interface 400 for a tennis shoe sole view or bottom view of tennis shoes for men 410. The user interface 400 includes a sole view (bottom view perspective) of several tennis shoes as depicted at 412 as well as item details 414 for each item. In accordance with at least one embodiment, the service provider computers implementing the image selection feature may be configured to provide a zoomed in or focused view of a particular image using the pixel ranges of an image associated with the item attribute in question that are identified by the class activation image processing algorithm. For example, the service provider computers may identify that a sole view is enhanced by providing a zoomed in or in focus or greater detail view of the bottom of tennis shoes and utilize the pixel ranges included in the 2-D map for the image to update or alter the resolution or focus of an image and present a zoomed in view of an item.

Figure 5:
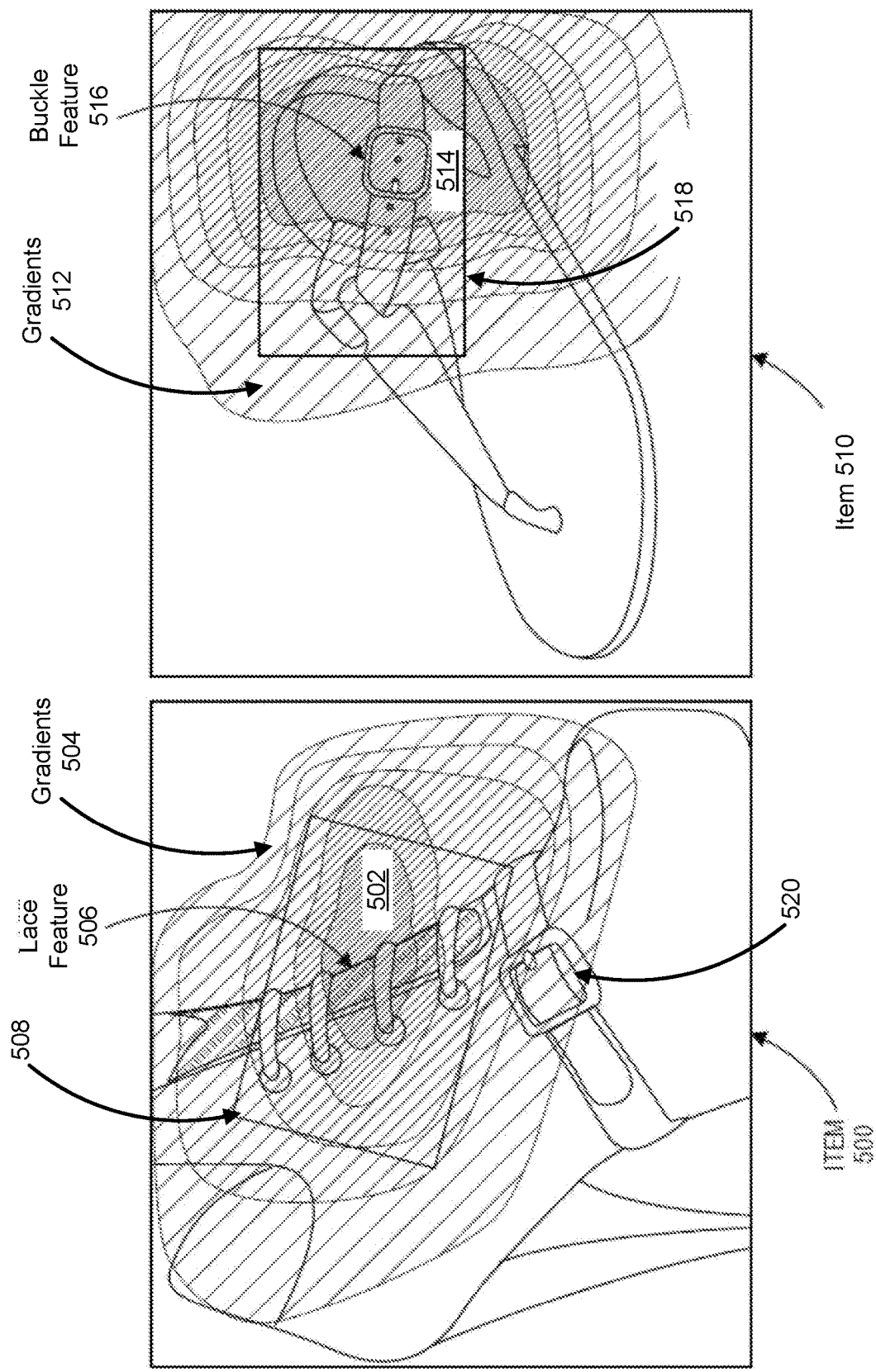
FIG. 5 illustrates identified pixel areas for an item attribute in an image as determined by a class activation image processing algorithm of the image selection feature, in accordance with at least one embodiment.

FIG. 5 illustrates identified pixel areas for an item attribute in an image as determined by a class activation image processing algorithm of the image selection feature, in accordance with at least one embodiment. In accordance with at least one embodiment, the service provider computers implementing the image selection feature may generate 2-D maps or heat maps that identify pixel ranges or coordinates within an image of an item that are associated with the detected feature by the neural network image processing algorithm for a given item attribute. For example, in FIG. 5 an image of an item 500 (a heeled shoe) may include an increased intensity area 502 that corresponds to the pixel ranges of a heat map (pictured as gradients in FIG. 5 as 504) that corresponds to the identified area of the image of the item that is associated with an item attribute such as the lace feature 506 for item 500. FIG. 5 also depicts a bounding box 508 that may represent an area of the item for item 500 that may be zoomed into by the service provider computers when displaying the lace feature 506 attribute for item 500 in a user interface presenting images for the item 500.

FIG. 5 also depicts another example of an image of an item 510 (a slipper) that includes a different gradient 512 as well as increased intensity area 514 that corresponds to the identified area of the image of the item 510 that is associated with a buckle feature 516. The item 510 is also illustrated with a bounding box 518 that may be utilized by the service provider computers to provide a zoomed in view of the buckle feature 516. As illustrated in FIG. 5, the class activation image processing algorithm is configured to identify different portions of images of items that corresponds to particular item attributes present in an image of an item. In embodiments, the class activation image processing algorithms may be configured to identify multiple areas or portions of the image where each area or portion is associated with a different item attribute present or depicted in the image for the item. For example, with the item 500, a separate high intensity area or pixel range may be identified for the buckle 520 present in the image for item 500. In embodiments, the item attributes detected by the neural network image processing algorithms may be verified by the heat maps, 2-D maps, and/or pixel ranges identified by the class activation image processing algorithm prior to an item attribute being associated with a given item based on the processing of the images for the item. It should be noted that the neural network image processing algorithm is configured to generate attention scores for a single attribute in an image or multiple attributes in an image. For example, one attention score may be generated for the lace feature 506 in the image of item 500 as well as another attention score for the buckle feature 520 in the image of item 500.

Figure 6:
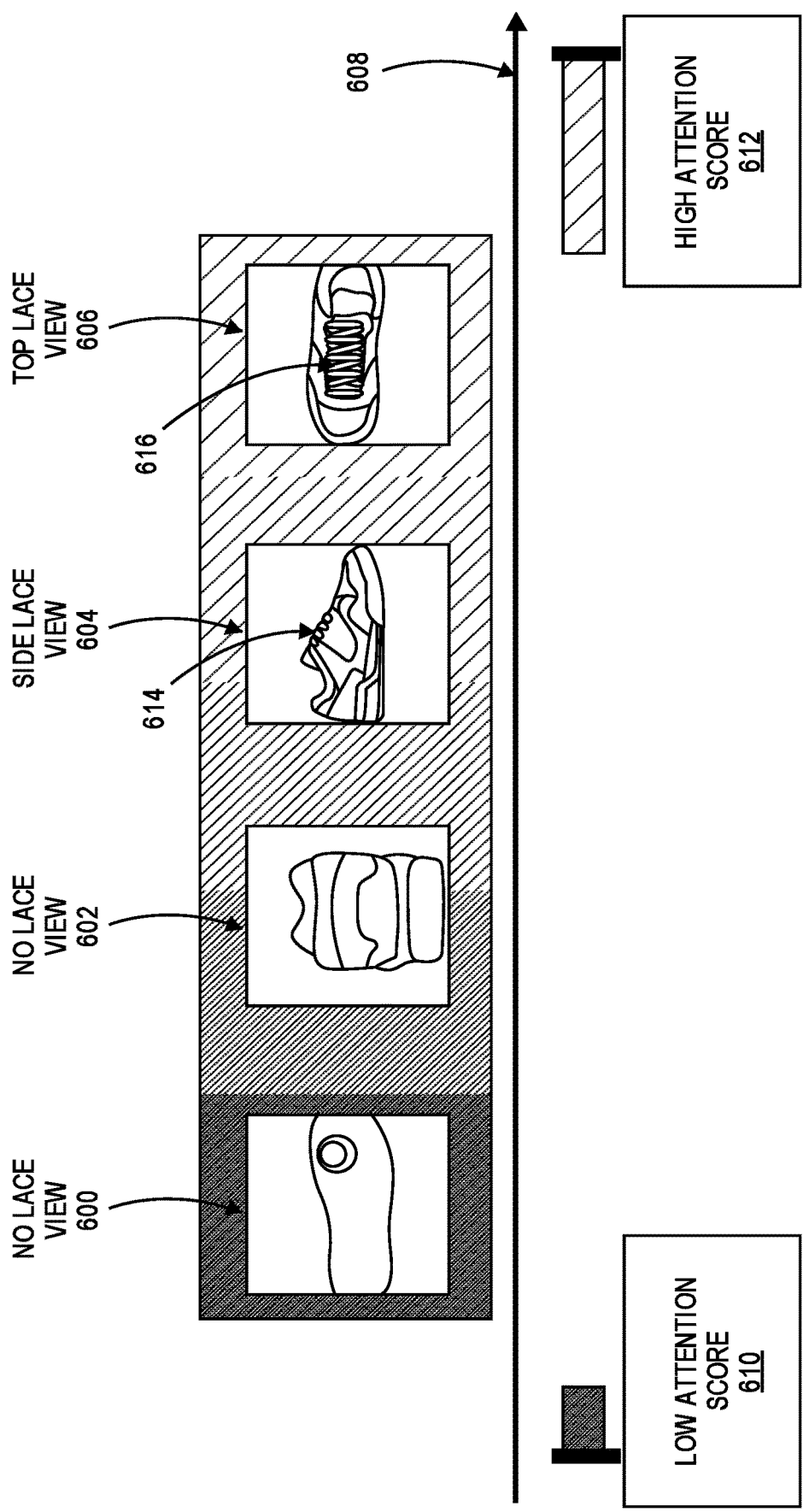
FIG. 6 illustrates an example attention score variation between images of an item for an item attribute for the image selection feature, in accordance with at least one embodiment.

FIG. 6 illustrates an example attention score variation between images of an item for an item attribute for the image selection feature, in accordance with at least one embodiment. FIG. 6 depicts various views or perspectives of an item 600, 602, 604, and 606 along a gradient 608 that goes from a low attention score 610 to a high attention score 612 for a particular item attribute. In FIG. 6, the gradient 608 includes a change in gradient for the images being of one gradient associated with a low attention score 610 to another gradient for the images being of another gradient associated with a high attention score 612. As described herein, the neural network image processing algorithm may be configured to generate an attention score for an item attribute detected in an image for an item. FIG. 6 includes four different images 600-606 for a pair of tennis shoes that each includes a different perspective or view of the tennis shoe.

In FIG. 6, the item attribute detected or queried for by the user may be a closure type of laces. As depicted in FIG. 6, the image 600 for the tennis shoe is from a bottom view or sole view and no laces are detected. As such, a generated attention score for image 600 would be very low compared to the generated attention score for images 604 and 606. To continue the example, image 602 includes a back view of the back of the tennis shoe where the laces are also not included in the images. As such, the attention score generated for 602 would also be low for the item attribute of laces. Continuing on the gradient 608, the image 604 depicts a side view of the tennis shoe that displays some of the laces for the tennis shoe at 614. Accordingly, the attention score for image 604 would be greater than the attention score for images 600 or 602 but less than the attention score for image 606 as it only shows a partial view of the laces and not a complete view of the laces such as in image 606. The attention score generated for image 606 would be the highest attention score among the four generated attention scores for images 600-606 to represent the greater likelihood of the item attribute in question (laces) being present or included in the image or perspective of the item in the image 606.

In accordance with at least one embodiment, the user interfaces generated by the service provider computer for the image selection feature described herein may be configured to configure the presentation of the one or more images of each item such that the presentation of the images denotes the highest attention scored image first and followed in descending order of attention score by the other images. For example, given the images 600-606 for a pair of tennis shoes that are associated with an item, if a user were to click on an item detail page for the pair of tennis shoes and had queried for closure type of laces, the image 606 would be presented first according to the associated attention score for the laces present in image 606 followed by image 604, 602, and 600 accordingly. Placement of the highest ranked image for an item attribute can take one of many configurations within an item detail page as is suitable for conveying that the first image presented or displayed includes the image with the highest attention score for the item attribute in question or item attributes in question for the item.

Figure 7:
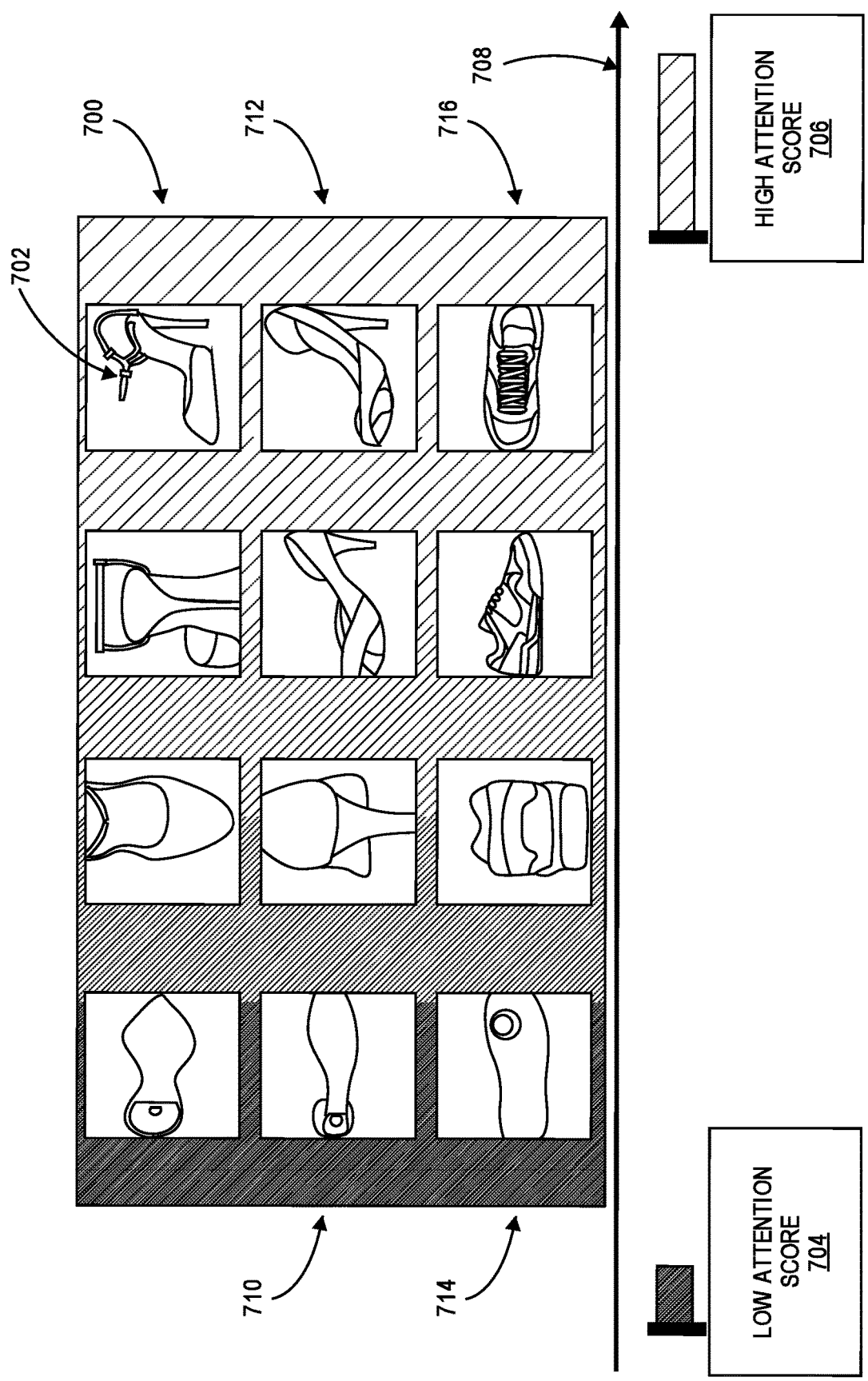
FIG. 7 illustrates an example attention score variation between images for a plurality of items for an item attribute for the image selection feature, in accordance with at least one embodiment.

FIG. 7 illustrates an example attention score variation between images for a plurality of items for an item attribute for the image selection feature, in accordance with at least one embodiment. In FIG. 7, several images of associated items are processed by the neural network image processing algorithm to generate scores for different item attributes. For example, the top row of images 700 may correspond to a pair of heels that the neural network image processing predicts a buckle feature for and generates appropriate attention scores for the buckle feature 702 that correspond to the low attention score 704 to high attention score 706 gradient 708. To continue the example presented in FIG. 7, the second row of images 710 for a different item may correspond to a detected item attribute of slip-on shoes with the highest attention scored image 712 being associated with an image of the item that best depicts the slip-on nature of the item. The image 712 would have the highest or greatest attention score generated for the slip-on item attribute in the set of images for the item included in row 710. The last row 714 of images for a tennis shoe may include a ranking according to generated attention scores for a lace feature best depicted in image 716 for the tennis shoes. As illustrated in FIG. 7, each row (700, 710, and 714) depict a ranking of the images for each item according to the associated attention score for the corresponding item attribute with the highest ranked image being on the right (high attention score 706) of the gradient 708, and the lowest ranked image being on the left (low attention score 74) of the gradient 708. Returning to the row 714 of images for the tennis shoe item, the image 716 would have the highest or greatest attention score for the lace item attribute of the tennis shoe according to the neural network image processing algorithm that uses the images included in row 714 for the tennis shoe item.

Figure 8:
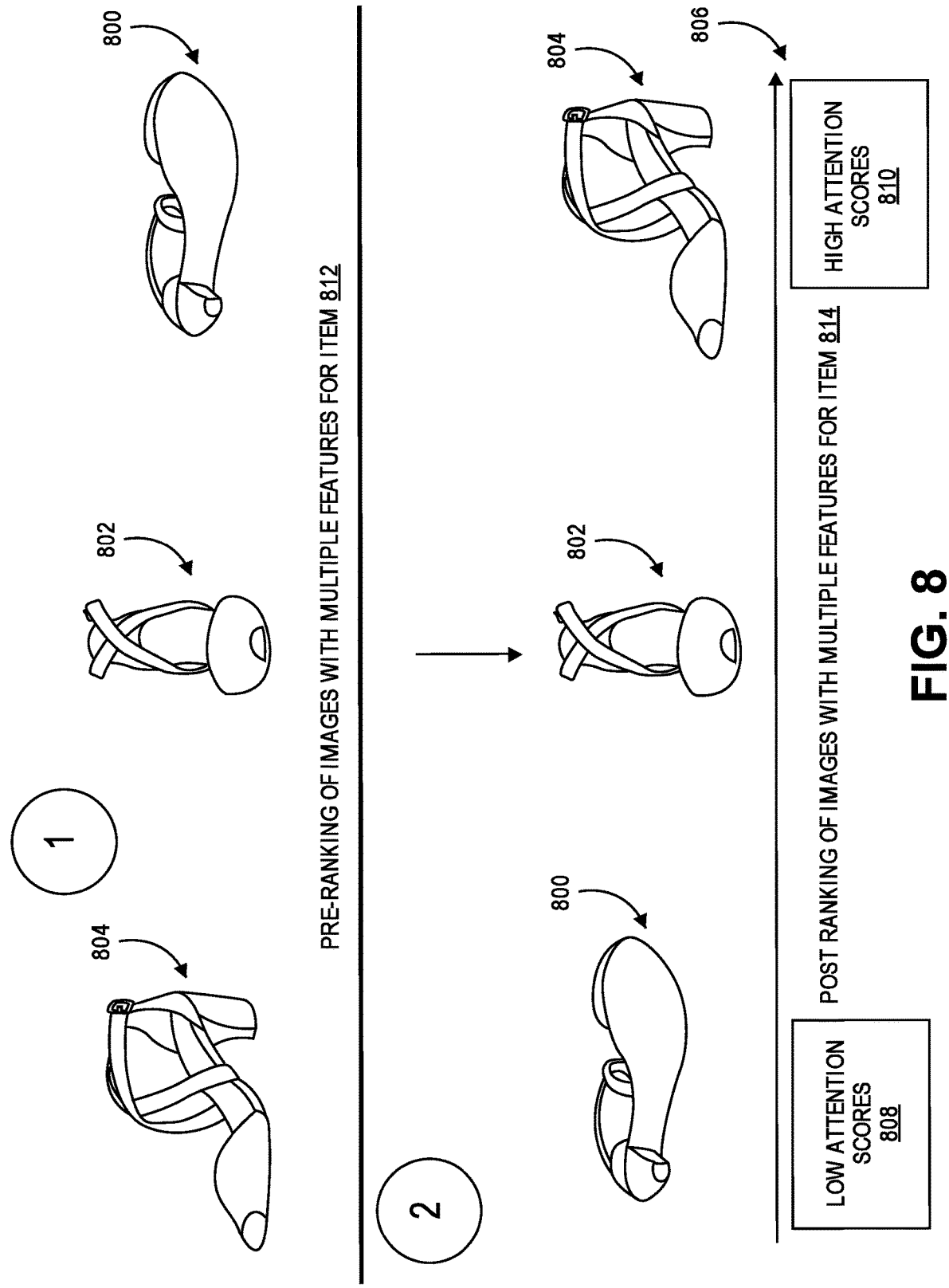
FIG. 8 illustrates an example workflow for ranking images of an item in response to a query for multiple item attributes in an image selection feature, in accordance with at least one embodiment.

FIG. 8 illustrates an example workflow for ranking images of an item in response to a query for multiple item attributes in an image selection feature, in accordance with at least one embodiment. In FIG. 8, at step 1, the images 800, 802, and 804 for a heeled shoe are not prioritized or ranked according to the image selection feature described herein. The images of the heeled shoe may include multiple item attribute features that are detected or predicted by the neural network image processing algorithm. For example, the images 800, 802, and 804 include a buckle feature as well as a heel feature. In accordance with at least one embodiment, at step 2, the neural network image processing algorithm may be configured to generate an attention score for each item attribute detected in the images 800-804 and rank the images 800-804 according to the aggregated attention scores for the features or item attributes associated with the images 800-804.

For example, the service provider computers implementing the image selection feature may be configured to rank an image that includes lower attention scores for multiple item attributes over an image that includes a higher attention score for only a single feature. As depicted in FIG. 8, at step 2, the images are ranked along a gradient 806 with the low attention scored images 808 being on the left of the gradient 806 and the high attention scored images 810 being on the right of the gradient. As illustrated in FIG. 8, the pre-ranking of images with multiple features or item attribute for the item at 812 may depict image 800 in response to a user interacting with an item listing for the heeled shoe depicted in FIG. 8 in a user interface associated with an online store. However, the user may be interested in the closure type of buckle in which case the image 800 would not be helpful for their browsing or shopping mission. In comparison, the post ranking of images with multiple features at 814 would display or present the image 804 first which depicts a view that is advantageous to the image 800 as it presents multiple item attributes associated with the heeled shoe such as the depiction of the heel item attribute and the buckle item attribute. Other mechanisms for identifying which image to display for an item in accordance with a queried or indicated item attribute(s) are also suitable for the disclosure herein. For example, the attention scores for multiple item attributes may be added together or otherwise aggregated or the service provider computers may utilize one or more policies which indicate one item attribute trumps another item attribute for a given category of items.

Figure 9:
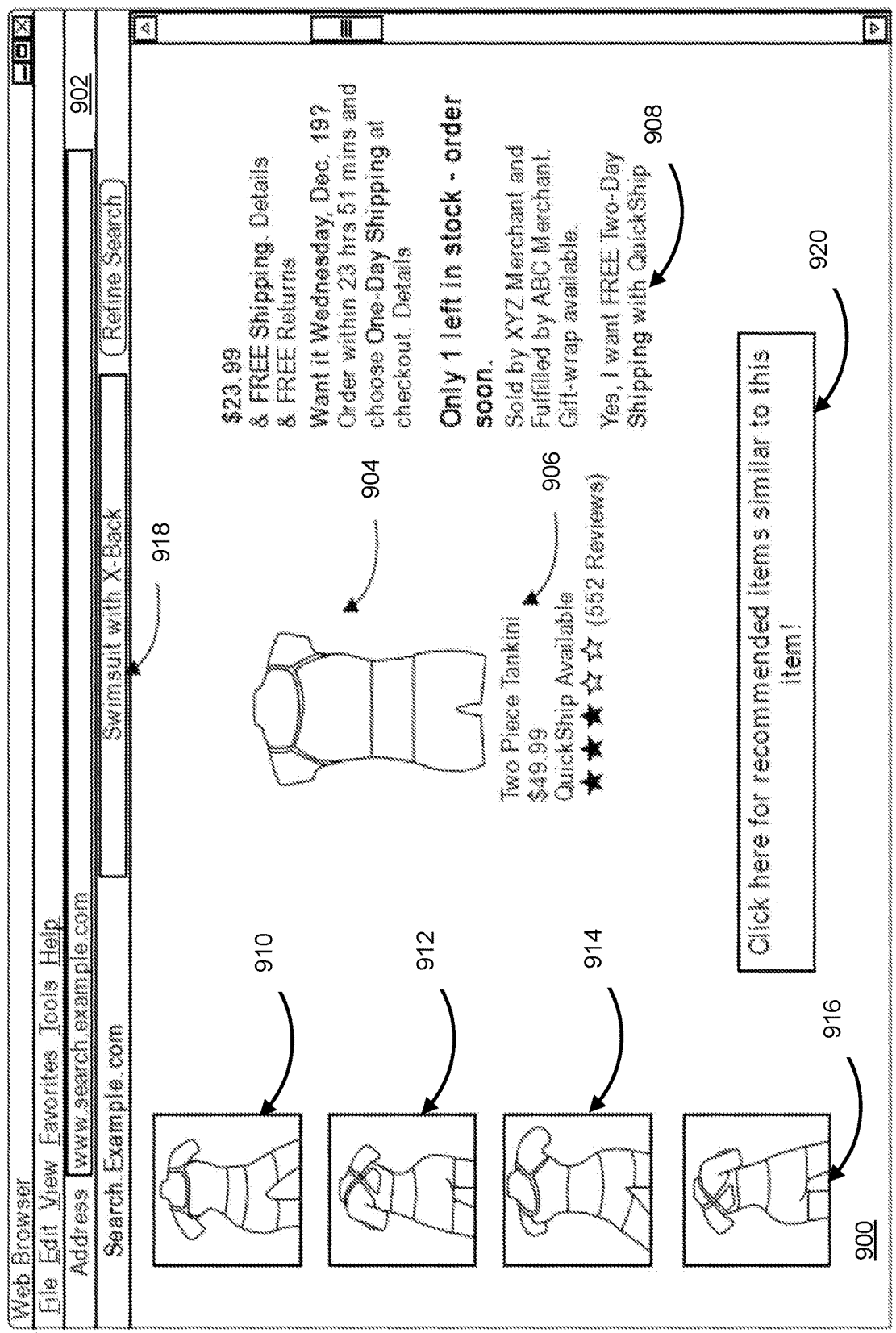
FIG. 9 illustrates a user interface displaying item details for an item.

FIG. 9 illustrates a user interface displaying item details for an item. FIG. 9 illustrates a user interface 900 presented by a web browser 902. In the user interface 900, a user may have interacted with a previous search result set of items, such as item result set presented via user interface 100 of FIG. 1 to be presented with item details for a specific item such as item 904. FIG. 9 also includes some items details about the item 904 such as a price and reviews 906 and shipping options 908. Conventional user interfaces such as user interface 900 may present images 910-916 without utilizing a context or attribute included in the query 918 (e.g., Swimsuit with X-back). The presentation of associated images 910-916 of item 904 may be disadvantageous for users that are looking for a certain attribute of an item, such as an X-back swimsuit, as they may have to scroll through the images 910-916 until they find one that is relevant or otherwise further interact with user interface 900 to find images that are relevant to their query 918. The image of the item 904 includes a front facing image or perspective such that it is unhelpful to someone searching for an X-back swimsuit. Users may grow frustrated as they scroll through the associated images 910-916 to find the appropriate image that is relevant to their search context (918). User interface 900 of FIG. 9 may also include a recommendation, notification, or hyperlink to recommended items similar to the item 904.

Figure 10:
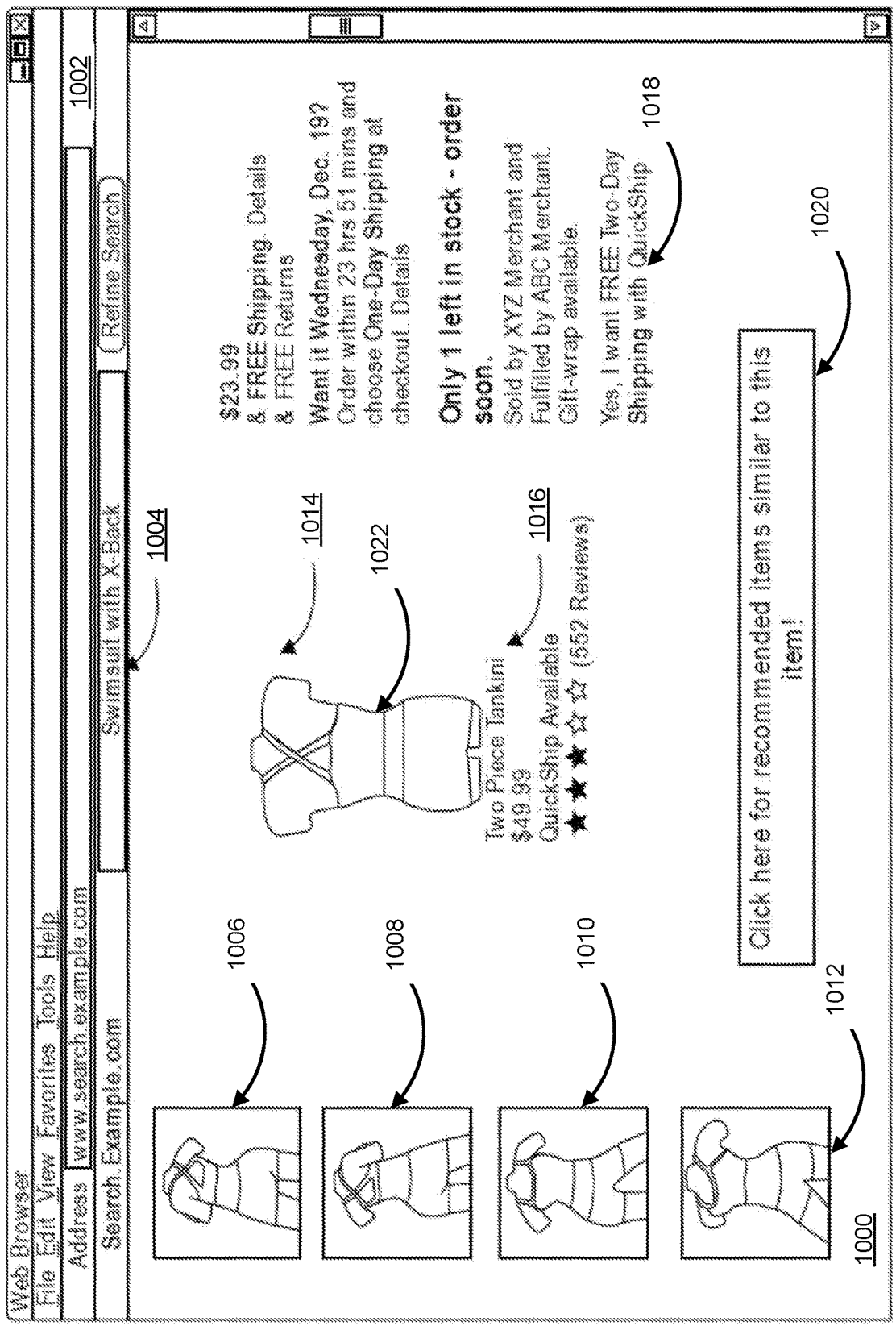
FIG. 10 illustrates an example user interface displaying ranked images of the item according to an implementation of an image selection feature, in accordance with at least one embodiment.

FIG. 10 illustrates an example user interface displaying ranked images of the item according to an implementation of an image selection feature, in accordance with at least one embodiment. FIG. 10 depicts user interface (UI) 1000 presented via web browser 1002 that implements the image selection feature described herein. In accordance with at least one embodiment, a user may provide a search text string or query 1004 ("Swimsuit with X-back") similar to the query 918 of FIG. 9. In embodiments, the service provider computers implementing the image selection feature and the user interface 1000 may be configured to rank the associated images 1006-1012 of item 1014 such that the images (1006 and 1008) with the highest attention score for the attribute in question (X-back) are presented first via the user interface 1000. In comparison to the associated images 910-916 of item 904 from FIG. 9 which present or display front facing or random order of images which may or may not be relevant to the search context of X-back, the associated images 1006-1012 are ranked according to associated attention scores which the service provider computer uses to order or present the images such that the top most image, in this use case, represents an image (1006) that has the highest attention score for the X-back attribute compared to all the other associated images (1008-1012).

FIG. 10 also depicts information about the item 1016 as well as shipping options 1018 and recommended items 1020. It should be noted that the image for item 1014 presented via user interface 1000 depicts a perspective that displays the item attribute in question (X-back) by displaying a rear perspective of the item 1014 in comparison to the front perspective of the image of item 904 presented via user interface 900 of FIG. 9. By ranking the associated images 1006-1012 using the generated attention scores for the attribute in question (X-back) a user may easily browse through item detail pages, such as the user interface 1000, for items without requiring to interact or otherwise scroll through multiple associated images for the item 1014. For example, the associated images 1006-1012 may be ranked such that the top most image represents the best image and perspective for the item attribute in question and the other images include the best image and perspective for the item attribute in descending order. Thus, a user may not wish to interact with or browse through images 1010 and 1012 as they do not present a perspective of interest given their search context 1004. It should also be apparent that the main image 1022 for item 1014 presented via user interface 1000 includes a rear perspective that best displays the item attribute associated with the search context or query 1004.

Figure 11:
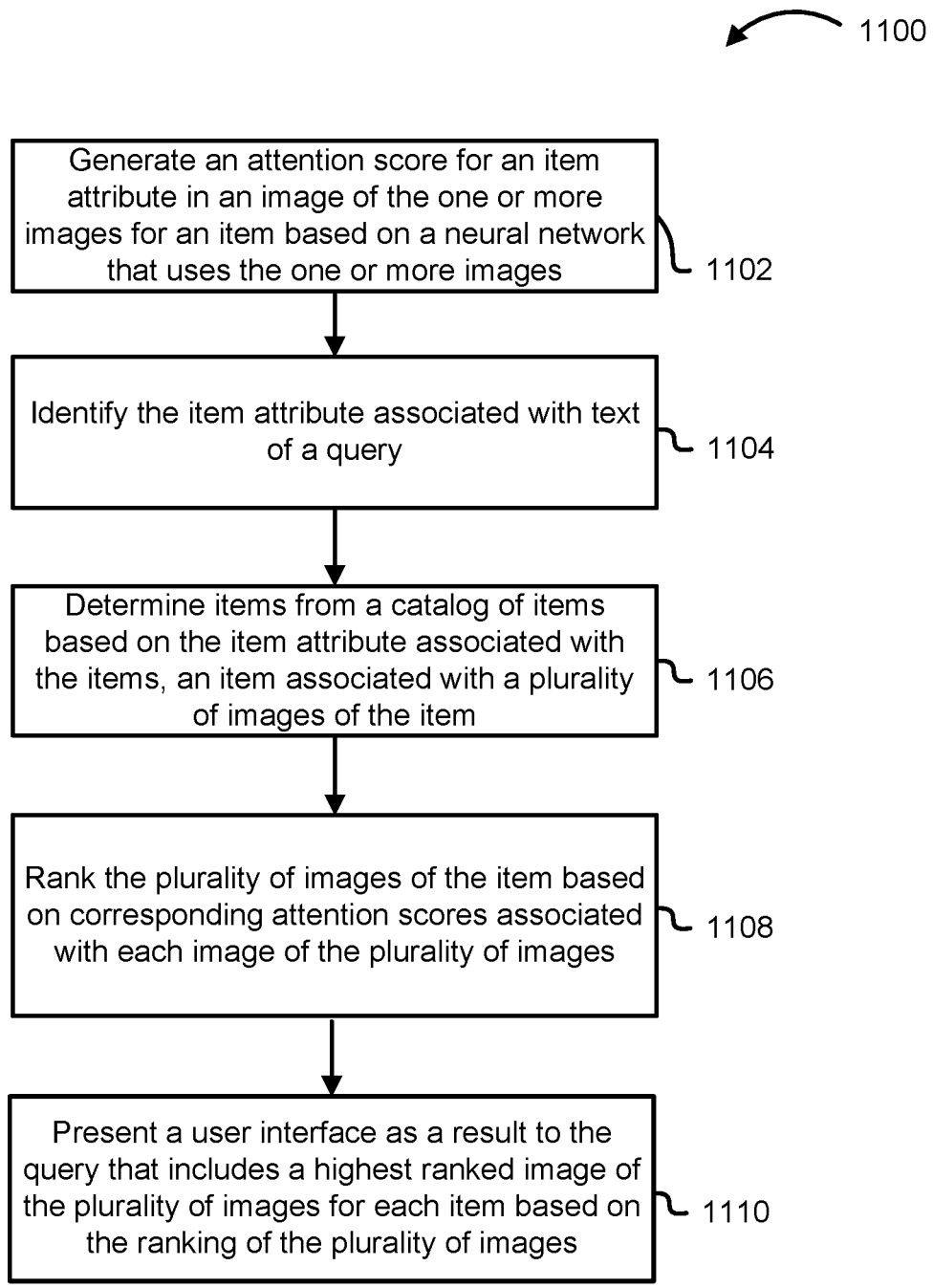
FIG. 11 illustrates an example flow diagram for an image selection feature, in accordance with at least one embodiment.
Figure 12:
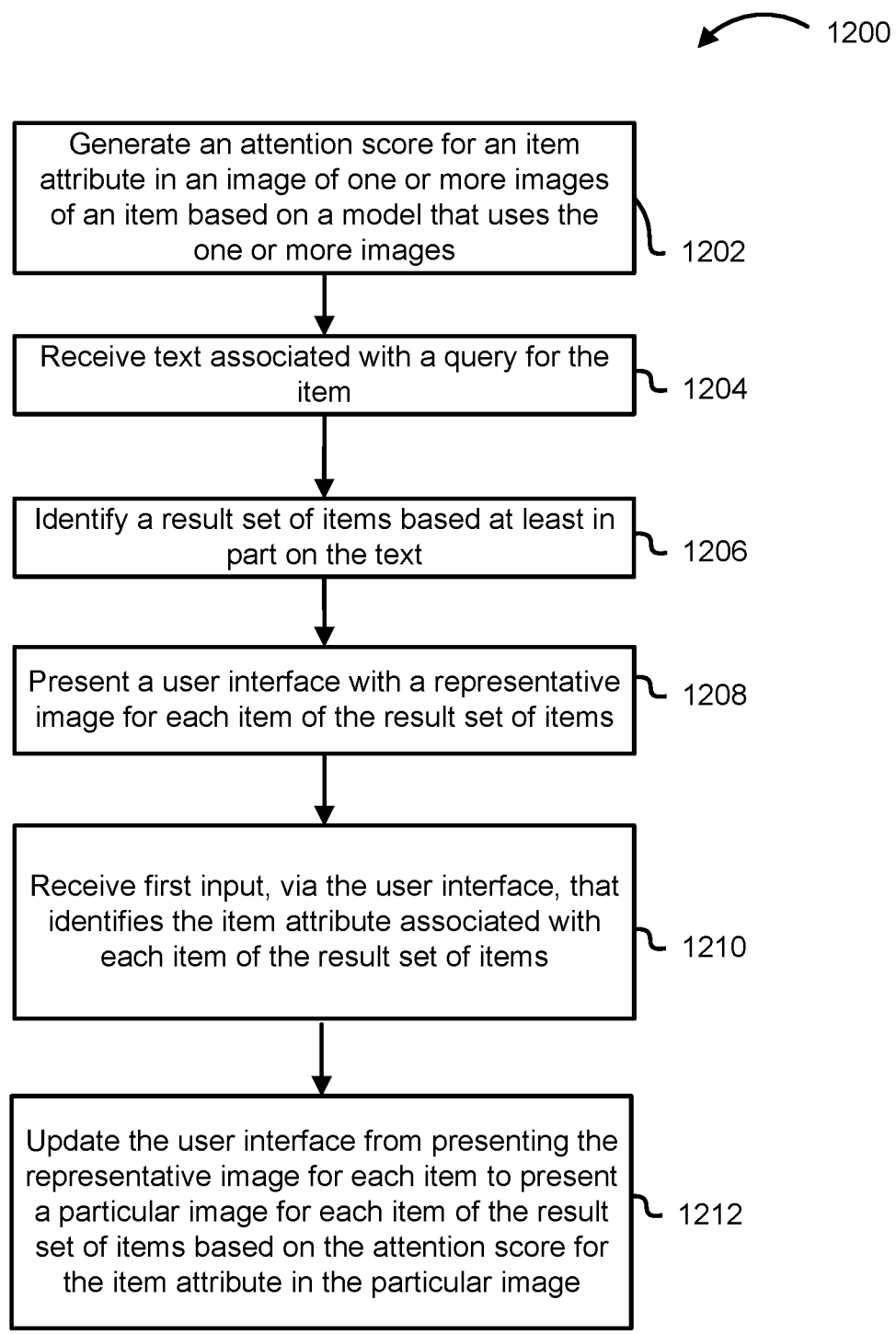
FIG. 12 illustrates an example flow diagram for an image selection feature, in accordance with at least one embodiment.

FIGS. 11 and 12 illustrate example flow charts for highlight features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 13:
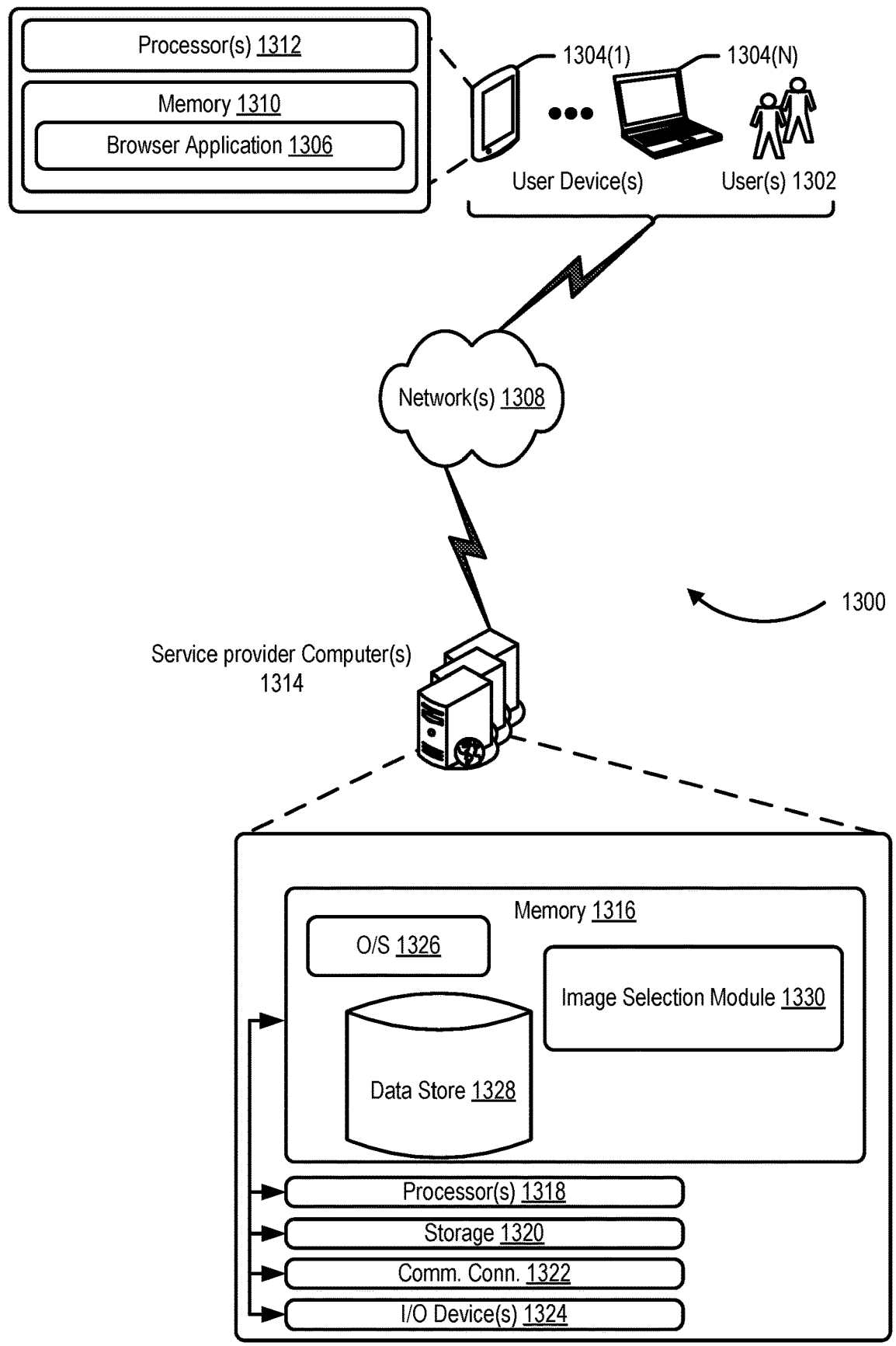
FIG. 13 illustrates an example architecture for implementing an image selection feature as described herein that includes one or more service provider computers and/or a user device connected via one or more networks, in accordance with at least one embodiment.

In some examples, service provider computers (service provider computers 1314) utilizing at least the image selection module 1330 depicted in FIG. 13 may perform the processes 1100 and 1200 of FIGS. 11 and 12. In FIG. 1, the process 1100 may include generating an attention score for an item attribute in an image of one or more images for an item based at least in part on a neural network that uses the one or more images at 1102. The process 1100 may include identifying an item attribute of an item based at least in part on text of a query at 1104. In embodiments, the item attribute may be extracted from the text of a search query or item search provided by a user in a user interface associated with an online store. The process 1100 may include determining items from a catalog of items based at least in part on the item attribute associated with the items where an item in the catalog of items is associated with a plurality of images of the item at 1106. In accordance with at least one embodiment, the catalog of items may be determined based on text associated with each item compared to the text of the query for the item. For example, information associated with an item maintained by an online store may include a description of features or attributes associated with the item such as a resolution range for a flat screen television or a shoe closure type of a shoe. In accordance with at least one embodiment, the item attribute associated with the text of the query may be identified or determined based at least in part on a text classifier which uses the string of the query or text provided by a user and classifies one or more attributes associated with the text or query. In embodiments, natural language processing may be utilized to identify one or more attributes included in a string of text or query provided by a user.

The process 1100 may include ranking the plurality of images of the item based at least in part on corresponding attention scores associated with each image of the plurality of images at 1108. In embodiments, an attention score may represent the likelihood of the item attribute being present in a given image of the set of images associated with an item. In accordance with at least one embodiment, an example of the neural network may be a convolutional neural network for image processing. The highest ranked image for the one or more images associated with an item may represent the image that includes the best perspective or view of the item attribute in question for the item. The process 1100 may include presenting a user interface as a result to the query that includes a highest ranked image of the plurality of images for each item based at least in part on the ranking of the plurality of images at 1110.

In accordance with at least one embodiment, the attention scores for the item attribute for the items included in a result set (item result set) for a query of an item may be determined dynamically upon receiving the query or identifying the item attribute or periodically such as every hour, every day, every week, etc. In embodiments, the attention scores may be generated for the item attributes associated with an item and the corresponding images of the item offline or prior to receiving a query. In response to receiving a query or text string associated with a query the service provider computers may rank or otherwise weigh the images for an item in an item result set based at least in part on the corresponding attention scores associated with each image for an item. In accordance with at least one embodiment, a representative image (e.g., the image designated by the content creator or by the online store as representing the corresponding item) may not be updated to the highest ranked image for the item until the interface receives input of a hover over or selection of the item in response to user input. For example, the result set of items and corresponding images that are presented to the user in response to a query for an item may include the representative image of the item even though each image associated with each item has been ranked according to a generated attention score for an item attribute. To continue the example, upon a user utilizing a mouse of a computer device to hover over a particular item listing or UI object, the representative image may update or change to the highest ranked image for that item attribute and item. In embodiments, the UI may update to scroll to the appropriate image in a carousel collection or presentation of images for each item.

In FIG. 12 the process 1200 may include generating an attention score for an item attribute in an image of one or more images of an item based at least in part on a model that uses the one or more images at 1202. The process 1200 may include receiving text associated with a query for an item at 1204. The process 1200 may include identifying a result set of items based at least in part on the text at 1206. In embodiments, a result set of items may include one or more items that are associated with text or information similar to that of the text of the query for the item. Each item in the result set of items may include images, price information, shipping information, user reviews, etc., where one of the images may be a representative image that the user interface is configured to present in response to a query by default. The process 1200 may include presenting a user interface with a representative image for each item of the result set of items at 1208. The process 1200 may include receiving first input, via the user interface, that identifies an item attribute associated with each item of the result set of items at 1210. For example, the user interface may be populated with item attributes identified by the service provider computer for the result set of items. A user may interact with one or more item attributes via the user interface to update the image presented in the user interface for each item based on associated attention scores for the item attribute in each image.

The process 1200 may include updating the user interface from presenting the representative image for each item to present a particular image for each item of the result set of items based at least in part on the attention score for the item attribute in the particular image at 1212. In accordance with at least one embodiment, the image selection feature may rank or prioritize reviewer or user provided images for an item based on generating an attention score for the provided images. In some embodiments, a user or reviewer provided image may become the highest ranked image and presented via a user interface in response to an appropriate query and item attribute selection. In embodiments, the item result set that corresponds to a query or search string for an item or items may be generated by the service provider computers based at least in part on information associated with each item in the item result set. For example, text or metadata associated with each item may be parsed to determine potential item attributes associated with each item to determine if the item should be included in the item result set. In embodiments, the neural network image processing algorithm or model may be configured to identify or predict item attributes associated with an item based on the images associated with the item. The item attributes identified by the image processing algorithm may be associated with an item upon identification by the service provider computers.

In accordance with at least one embodiment, the service provider computers may be configured to provide a user interface that receives input from a user to associate a tag with a certain perspective of an item image. For example, the user may utilize the image selection features described herein to be presented with a front view of evening dresses. As described herein, the images of the item result set may be ranked according to the attention scores for a front view such that each item image in the item result set presents a front view of an evening dress. A user may interact with the user interface displaying the item result set to associate a tag with the particular portion of the image that corresponds to the dress. In response to receiving the input and associating the tag, the service provider computers may generate a UI object or data object that is configured to be interleaved or otherwise combined with an image of a user to generate another UI object or data object. By providing such a feature users are able to quickly mix and match outfits on a representation of themselves (an image of themselves) by overlaying or combining the portion of the image of the item that was tagged with an image of themselves.

FIG. 13 illustrates an example architecture for implementing the image selection feature, in accordance with at least one embodiment. In architecture 1300, one or more users 1302 (e.g., customers, users, consumers, etc.) may utilize user computing devices 1304(1)-(N) (collectively, user devices 1304) to access a browser application 1306 or a user interface (UI) accessible through the browser application 1306, via one or more networks 1308 to request content including items offered by an online store as well as particular item attributes associated with the items for prioritizing the images associated with each time that are presented in response to the query or search for an item. In embodiments, the one or more users 1302 may utilize user computing devices 1304(1)-(N) to access the browser application 1306 or a UI accessible through the browser application 1306, via one or more networks 1308, to search for or otherwise request items and item attributes for an item offered by an online store and implemented by or maintained by service provider computers 1314. The one or more users 1302 may utilize user computing devices 1304(1)-(N) to access the browser application 1306 or a UI accessible through the browser application 1306, via one or more networks 1308, to provide a search query for an item such as "swimsuits with an X-back" or select a particular item attribute associated with items in response to the query. In embodiments, the UI or browser application 1306 may present one or more options where each option is associated with an item attribute of an item result set generated by the service provider computers 1314 on behalf of an online store. The "browser application" 1306 can be any browser control or native application that can access and display a network page or other information such as a user interface of a native software application for enabling the selection or interaction of data objects, images, or other suitable information associated with presenting items offered by an online store. A native software application may include an application or program that has been developed for use on a particular operating system or a particular device (such as a particular type of mobile device or user device 1304). In embodiments, the user device 1304 may include one or more components for enabling the user 1302 to interact with the browser application 1306.

The user devices 1304 may include at least one memory 1310 and one or more processing units or processor(s) 1312. The memory 1310 may store program instructions that are loadable and executable on the processor(s) 1312, as well as data generated during the execution of these programs. Depending on the configuration and type of the user devices 1304, the memory 1310 may be volatile (such as random access memory (RAM)) and/or non-volatile (such as read-only memory (ROM), flash memory, etc.). The user devices 1304 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1304. In some implementations, the memory 1310 may include multiple different types of memory, such as static random access memory (SRAM), dynamic random access memory (DRAM), or ROM.

Turning to the contents of the memory 1310 in more detail, the memory 1310 may include an operating system and one or more application programs or services for implementing the features disclosed herein.

The architecture 1300 may also include one or more service provider computers 1314 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 1314 may implement or be an example of the service provider computer(s) described herein with reference to FIGS. 1-12 and throughout the disclosure. The one or more service provider computers 1314 may also be operable to provide site hosting, media streaming services, computer application development, and/or implementation services, combinations of the foregoing, or the like to the one or more users 1302 via user devices 1304.

In some examples, the networks 1308 may include any one or a combination of many different types of networks, such as cable networks, the Internet, wireless networks, cellular networks, and other private and/or public networks. While the illustrated examples represents the users 1302 communicating with the service provider computers 1314 over the networks 1308, the described techniques may equally apply in instances where the users 1302 interact with the one or more service provider computers 1314 via the one or more user devices 1304 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1314 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1314 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1314 may be in communication with the user device 1304 via the networks 1308, or via other network connections. The one or more service provider computers 1314 may include one or more servers, perhaps arranged in a cluster or as individual servers not associated with one another.

In one illustrative configuration, the one or more service provider computers 1314 may include at least one memory 1316 and one or more processing units or processor(s) 1318. The processor(s) 1318 may be implemented as appropriate in hardware, computer-executable instructions, firmware, or combination thereof. Computer-executable instruction or firmware implementations of the processor(s) 1318 may include computer-executable or machine-executable instructions written in any suitable programming language to perform the various functions described when executed by a hardware computing device, such as a processor. The memory 1316 may store program instructions that are loadable and executable on the processor(s) 1318, as well as data generated during the execution of these programs. Depending on the configuration and type of the one or more service provider computers 1314, the memory 1316 may be volatile (such as RAM) and/or non-volatile (such as ROM, flash memory, etc.). The one or more service provider computers 1314 or servers may also include additional storage 1320, which may include removable storage and/or non-removable storage. The additional storage 1320 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1316 may include multiple different types of memory, such as SRAM, DRAM, or ROM.

The memory 1316, the additional storage 1320, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1316 and the additional storage 1320 are all examples of non-transitory computer storage media. Additional types of non-transitory computer storage media that may be present in the one or more service provider computers 1314 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1314. Combinations of any of the above should also be included within the scope of non-transitory computer-readable media.

The one or more service provider computers 1314 may also contain communication connection interface(s) 1322 that allow the one or more service provider computers 1314 to communicate with a data store, another computing device or server, user terminals, and/or other devices on the networks 1308. The one or more service provider computers 1314 may also include I/O device(s) 1324, such as a keyboard, a mouse, a pen, a voice input device, a touch input device, a display, speakers, a printer, etc.

Turning to the contents of the memory 1316 in more detail, the memory 1316 may include an operating system 1326, one or more data stores 1328, and/or one or more application programs or services for implementing the features disclosed herein including the image selection module 1330. In accordance with at least one embodiment, the image selection module 1330 may be configured to at least generate attention scores for one or more item attributes for an item based on a neural network algorithm that uses images of the items to generate the attention scores for each item attribute. An attention score may represent the likelihood of the item attribute in a given image associated with an item. The image selection module 1330 may be configured to rank the images of an item based on the item attribute associated with a query and the corresponding attention score for the item attribute in a given image. In embodiments, the image selection module 1330 may be configured to update a user interface to prioritize presenting the highest ranked (according to the corresponding attention score) image of a set of images associated with an item in response to a query for the item. The image selection module 1330 may be configured to generate a two dimensional (2D) map of each image that identifies pixel ranges in the image that correspond to the item attribute present in the image as determined by a class activation image processing algorithm which is also implemented by the image selection module 1330. The image selection module 1330 may be configured to present images that are zoomed in or focused on a particular pixel range of an image based on the 2D maps or other suitable output from the class activation image processing algorithm. The image selection module 1330 may be configured to aggregate or utilize multiple attention scores for multiple item attributes in prioritizing or ranking images when a query for an item includes multiple item attributes such that an image that includes one or more attributes may be ranked above an image that only includes one attribute.

Figure 14:
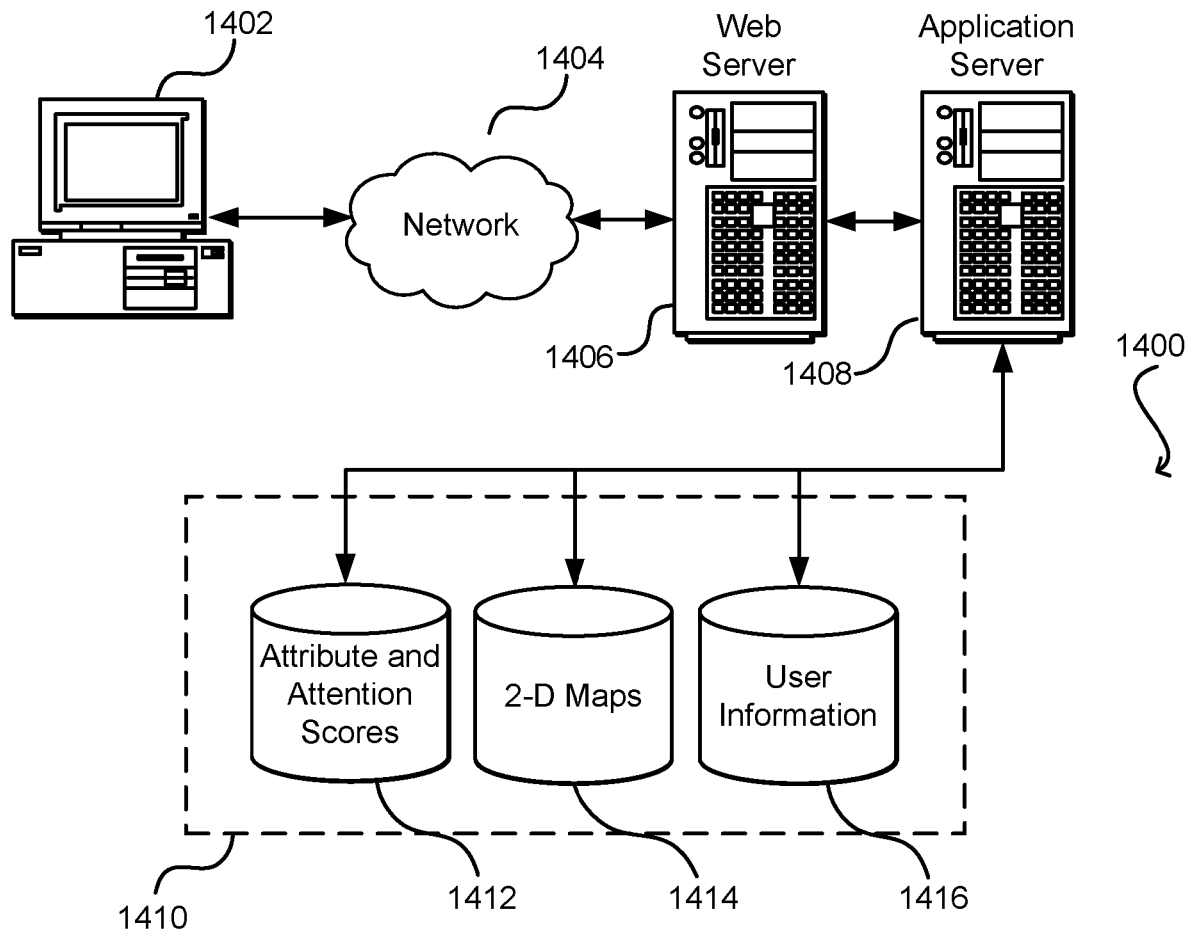
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing attribute and attention score pair data 1412 and user information 1416, which can be used to serve content for the production side as well as prioritize images associated with an item in response to identifying an attribute associated with text of a query for an item as described herein. The data store also is shown to include a mechanism for storing 2-D Maps data 1414, which can be used for reporting, analysis, or other such purposes such as providing zoomed in images of an item based on the pixel ranges identified in the 2-D maps data and generated by the class activation image processing algorithms. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information 1416 to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser. The images of the particular item of interest can be prioritized according to associated attention scores that are generated for each image associated with an item by a neural network.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtext in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating, by a computer system, an attention score for an item attribute in an image of one or more images for an item based at least in part on a neural network that uses the one or more images, the attention score identifying a likelihood of the item attribute being present in the image;

identifying, by the computer system, the item attribute associated with text of a query based at least in part on a text classifier configured to use a string of the query to classify the item attribute associated with the text;

determining, by the computer system, items from a catalog of items based at least in part on the item attribute associated with the items, an individual item of the items associated with a plurality of images;

identifying, by the computer system, a pixel range in each image of the plurality of images based at least in part on an algorithm, the pixel range representing areas in each image where the item attribute is identified by the neural network as being present in the image;

ranking, by the computer system, the plurality of images of the individual item based at least in part on corresponding attention scores associated with each image of the plurality of images;

presenting, by the computer system, a user interface as a result to the query that includes a highest ranked image of the plurality of images for each item of the items based at least in part on the ranking of the plurality of images;

updating, by the computer system, the user interface to include a view of the pixel range associated with the item attribute in each ranked image of the plurality of images for each item; and updating, by the computer system, the user interface to present an individual image of the plurality of images for each item and scrolling to a first ranked image of the plurality of images in response to receiving input of an interaction with a particular item of the items.

2. The computer-implemented method of claim 1, wherein generating the attention score for the item attribute occurs periodically.

3. A non-transitory computer-readable storage medium storing computer-executable instructions that, when executed by a computer system, configure the computer system to perform operations comprising:

generating an attention score for an item attribute in an image of one or more images for an item based at least in part on a model that uses the one or more images of the item, the attention score identifying a likelihood of the item attribute being present in the image;

obtaining the item attribute for the item associated with a query for the item based at least in part on a text classifier configured to use a string of the query to classify the item attribute associated with text of the query;

determining a plurality of items based at least in part on the item attribute being associated with the plurality of items, an individual item of the plurality of items including a plurality of images of the item;

identifying a pixel range in each image of the plurality of images based at least in part on an algorithm, the pixel range representing areas in each image where the item attribute is identified by the model as being present in the image;

ranking the plurality of images of the individual item based at least in part on corresponding attention scores associated with each image of the plurality of images;

presenting a user interface as a result to the query that includes a highest ranked image of the plurality of images for each item of the plurality of items based at least in part on the ranking of the plurality of images;

updating the user interface that presents information about the plurality of items in response to the query to include a view of the pixel range associated with the item attribute in each ranked image of the plurality of images of the item; and updating the user interface to present an individual image of the plurality of images for each item and scrolling to a first ranked image of the plurality of images in response to receiving input of an interaction with a particular item of the plurality of items.

4. The non-transitory computer-readable storage medium of claim 3, wherein the computer-executable instructions, when executed by the computer system, configure the computer system to further perform operations comprising obtaining reviewer provided images for the item.

5. The non-transitory computer-readable storage medium of claim 4, wherein the model uses the one or more images of the item and the reviewer provided images for the item to generate the attention score for the item attribute in the image and each reviewer provided image of the reviewer provided images.

6. The non-transitory computer-readable storage medium of claim 3, wherein the computer-executable instructions, when executed by the computer system, configure the computer system to further perform operations comprising:

presenting the user interface that further presents the plurality of images of the individual item according to the ranking by the corresponding attention scores; and updating the user interface to replace an individual image of the plurality of images with a reviewer provided image of the item based at least in part on an associated attention score for the reviewer provided image and the associated attention score for the individual image.

7. The non-transitory computer-readable storage medium of claim 3, wherein the computer-executable instructions, when executed by the computer system, configure the computer system to further perform operations comprising maintaining the attention score for the item attribute in the image of the plurality of images associated with the query.

8. The non-transitory computer-readable storage medium of claim 3, wherein the computer-executable instructions, when executed by the computer system, configure the computer system to further perform operations comprising associating metadata with each image of the plurality of images that identifies each item attribute and an associated attention score for each item attribute, and a 2-D heat map for each item attribute generated by a class activation image processing algorithm.

9. A computer system comprising:

a memory configured to store computer-executable instructions; and a processor in communication with the memory configured to execute the computer-executable instructions to at least:

generate an attention score for an item attribute in an image of one or more images of an item based at least in part on a model that uses the one or more images, the attention score identifying a likelihood of the item attribute being present in the image;

receive text associated with a query for the item;

identify a result set of items based at least in part on the text;

determine item attributes in the result set of items based at least in part on a text classifier configured to use a string of the query to classify the item attributes associated with the text of the query;

identify a pixel range in each image of the one or more images for each item in the result set of items based at least in part on an algorithm, the pixel range representing areas in each image where the item attribute is identified by the model as being present in the image;

rank the one or more images for each item based at least in part on corresponding attention scores associated with each image of the one or more images;

present a user interface with a representative image for each item of the result set of items;

receive first input, via the user interface, that identifies the item attribute associated with each item of the result set of items;

in response to receiving the first input:

update the user interface from presenting the representative image for each item to present a particular image of the one or more images for each item of the result set of items based at least in part on the attention score for the item attribute in the particular image;

update the user interface to include a view of the pixel range associated with the item attribute for the particular image for each item of the result set of items; and update the user interface to present an individual image of the one or more images for each item and scrolling to a first ranked image of the one or more images in response to receiving second input of an interaction with a particular item of the result set of items.

10. The computer system of claim 9, wherein determining the item attributes includes using a convolutional neural network that uses images of the result set of items.

11. The computer system of claim 9, wherein the processor is further configured to receive third input that associates a tag to a portion of the particular image for the item attribute indicated by the first input.

12. The computer system of claim 11, wherein the processor is further configured to generate a first user interface element that corresponds to the portion of the particular image for the item attribute based at least in part on the tag.

13. The computer system of claim 12, wherein the processor is further configured to generate a second user interface element that includes the first user interface element interleaved into another image.

14. The computer system of claim 13, wherein the processor is further configured to generate a new data object that includes the first user interface element interleaved into the second user interface element, where the new data object is configured to be transmitted to one or more social media platforms or image sharing applications.

15. The computer system of claim 9 wherein the first input identifies a plurality of item attributes for the item, and wherein updating the user interface to present the particular image for each item of the result set of items is further based at least in part on an aggregated attention score for the plurality of item attributes in the particular image, the aggregated attention score generated by the model that uses the one or more images for the item.

* * * * *